United States Patent
Kim et al.

(10) Patent No.: US 11,119,622 B2
(45) Date of Patent: Sep. 14, 2021

(54) WINDOW EXPANSION METHOD AND ASSOCIATED ELECTRONIC DEVICE

(71) Applicant: Samsung Electronics Co., Ltd., Suwon-si (KR)

(72) Inventors: Jong-Min Kim, Busan (KR); Bu-Sic Koag, Gumi-si (KR); Joo-Yong Kim, Daegu (KR); In-Hyung Jung, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/199,076

(22) Filed: Nov. 23, 2018

(65) Prior Publication Data
US 2019/0095049 A1  Mar. 28, 2019

Related U.S. Application Data

(63) Continuation of application No. 14/445,406, filed on Jul. 29, 2014, now Pat. No. 10,139,982.

(30) Foreign Application Priority Data

Aug. 26, 2013 (KR) .................. 10-2013-0101402

(51) Int. Cl.
*G06F 3/0481* (2013.01)
*G06F 3/0488* (2013.01)

(52) U.S. Cl.
CPC .......... *G06F 3/0481* (2013.01); *G06F 3/0488* (2013.01); *G06F 2203/04803* (2013.01)

(58) Field of Classification Search
CPC .............. G06F 3/0481; G06F 3/0488; G06F 2203/04803; G06F 2203/04808;
(Continued)

(56) References Cited

U.S. PATENT DOCUMENTS

| 4,714,918 A | 12/1987 | Barker et al. |
| 5,546,520 A | 8/1996 | Cline et al. |

(Continued)

FOREIGN PATENT DOCUMENTS

| CN | 101334706 A | 12/2008 |
| CN | 101630219 A | 1/2010 |

(Continued)

OTHER PUBLICATIONS

Williams, Gregg, The Lisa Computer System, BYTE Publications Inc., Feb. 1, 1983, pp. 33-44, 46, 48, and 50, XP055166813, retrieved Feb. 3, 2015 from https://archive.org/details/byte-magazine/1983-02.

(Continued)

*Primary Examiner* — Stephen S Hong
*Assistant Examiner* — Ahamed I Nazar
(74) *Attorney, Agent, or Firm* — Jefferson IP Law, LLP

(57) ABSTRACT

A window expansion method is provided. The method includes detecting an occurrence of an expansion event for expanding a window area, and expanding the window area based on the expansion event. An electronic device is also provided, the electronic device including a display that includes a window area for displaying data and a non-window area, and at least one processor configured to expand the window area based on an expansion event for an expansion of the window area when the expansion event occurs.

16 Claims, 13 Drawing Sheets

(58) Field of Classification Search
CPC .... G06F 3/04847; G06F 3/14; G06F 3/04845; G06F 3/041
See application file for complete search history.

(56) References Cited

U.S. PATENT DOCUMENTS

| | | | |
|---|---|---|---|
| 2003/0001899 A1 | 1/2003 | Partanen et al. | |
| 2003/0214513 A1* | 11/2003 | Brown | G09G 5/28 345/611 |
| 2003/0214531 A1 | 11/2003 | Chambers et al. | |
| 2004/0100454 A1 | 5/2004 | Kang et al. | |
| 2005/0099407 A1 | 5/2005 | Pennington, II et al. | |
| 2007/0005670 A1 | 1/2007 | Pennington, II et al. | |
| 2007/0180397 A1* | 8/2007 | Hoyer | G06F 3/04886 715/780 |
| 2008/0189648 A1* | 8/2008 | Anglin | G06F 16/957 715/781 |
| 2009/0031248 A1 | 1/2009 | Kano et al. | |
| 2010/0011316 A1 | 1/2010 | Sar et al. | |
| 2010/0175021 A1 | 7/2010 | Ferrara et al. | |
| 2010/0248788 A1 | 9/2010 | Yook et al. | |
| 2011/0173566 A1 | 7/2011 | Ubillos | |
| 2011/0175930 A1 | 7/2011 | Hwang et al. | |
| 2012/0169974 A1 | 7/2012 | Yu | |
| 2012/0200513 A1 | 8/2012 | Kim et al. | |
| 2012/0260197 A1 | 10/2012 | Hwang | |
| 2013/0111338 A1 | 5/2013 | Huo et al. | |
| 2014/0164984 A1 | 6/2014 | Farouki | |
| 2014/0232671 A1* | 8/2014 | Chaudhri | G06F 3/04883 345/173 |
| 2014/0317561 A1* | 10/2014 | Robinson | H04N 7/15 715/800 |

FOREIGN PATENT DOCUMENTS

| | | |
|---|---|---|
| CN | 103092456 A | 5/2013 |
| EP | 2 595 042 A2 | 5/2013 |
| JP | 3855696 A | 2/2003 |
| JP | 2009-031863 A | 2/2009 |
| KR | 10-2004-0043454 A | 5/2004 |
| KR | 10-2006-0115321 A | 11/2006 |
| KR | 10-2007-0091852 A | 9/2007 |
| KR | 10-00791370 B1 | 1/2008 |
| KR | 10-2012-0079579 A | 7/2012 |
| KR | 10-2012-0091537 A | 8/2012 |
| KR | 10-1218820 B1 | 1/2013 |
| WO | 2012/162411 A1 | 11/2012 |

OTHER PUBLICATIONS

Motif Window Manager, last edited Apr. 28, 2010, retrieved Feb. 11, 2016, Wikipedia, the Free Encyclopedia, XP055249433.
Using the Motif Window Manager, Motif User's Guide, pp. 1-13, XP055249428.
Chinese Office Action dated Jun. 3, 2019, issued in Chinese Application No. 201410426343.4.
European Office Action dated Nov. 15, 2019, issued in European Application No. 18178347.3.
Chinese Office Action dated Apr. 1, 2020, issued in Chinese Patent Application No. 201410426343.4.
Korean Office Action dated Apr. 14, 2020, issued in Korean Patent Application No. 10-2013-0101402.
Korean Office Action dated Jan. 4, 2021, issued in Korean Patent Application No. 10-2020-0087037.
Korean Office Action dated Sep. 9, 2020, issued in Korean Patent Application No. 10-2020-0087037.
European Search Report dated Jan. 22, 2019, issued in the European application No. 18178347.

* cited by examiner

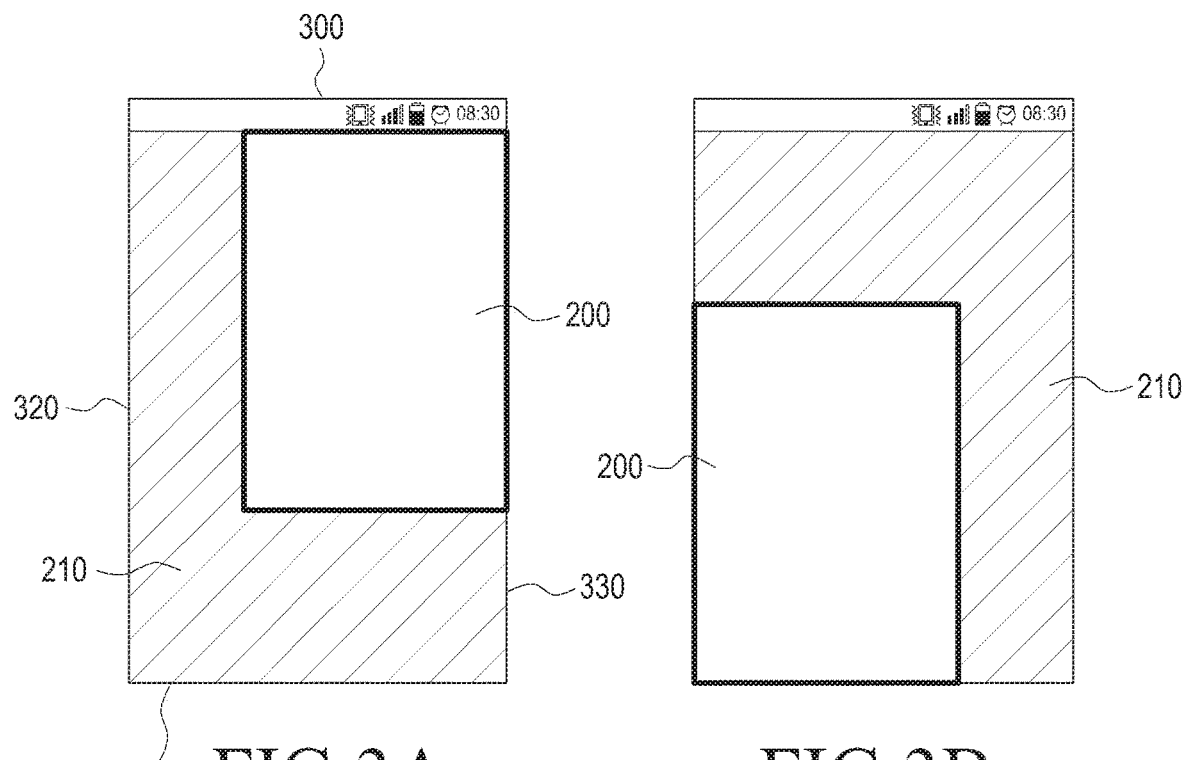
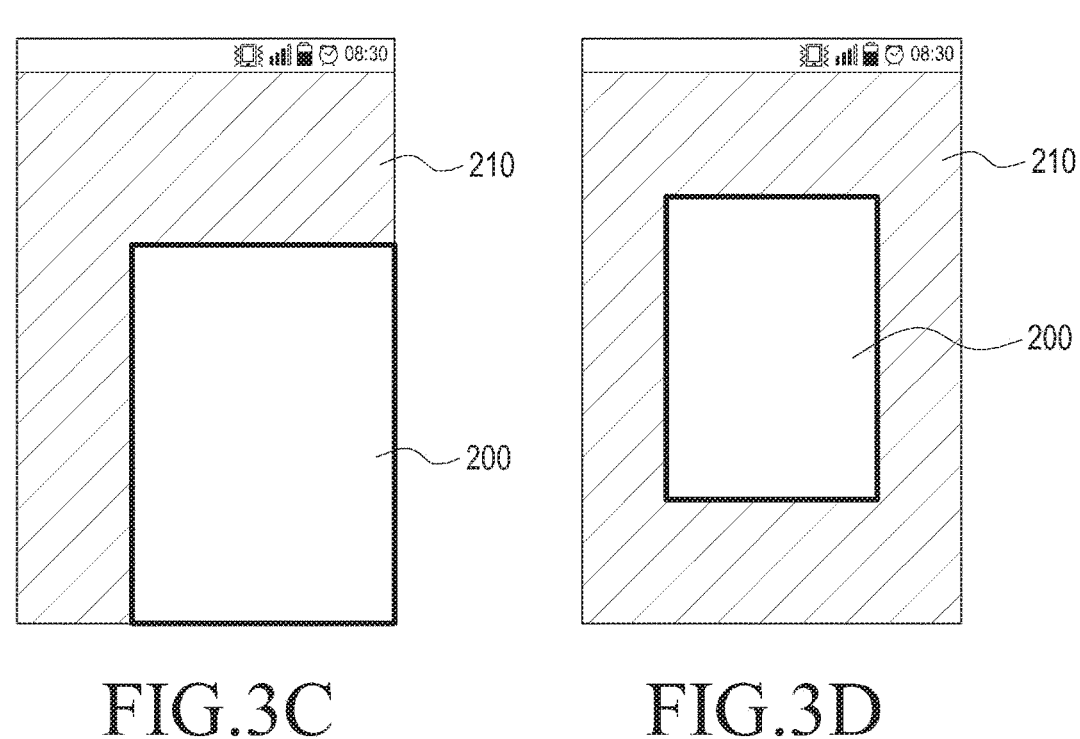
FIG.3A  FIG.3B
FIG.3C  FIG.3D

WINDOW EXPANSION METHOD AND ASSOCIATED ELECTRONIC DEVICE

CROSS-REFERENCE TO RELATED APPLICATION(S)

This application is a continuation application of prior application Ser. No. 14/445,406, filed on Jul. 29, 2014, which was based on and claimed priority under 35 U.S.C. § 119(a) of a Korean patent application number 10-2013-0101402, filed on Aug. 26, 2013, in the Korean Intellectual Property Office, the disclosure of which is incorporated by reference herein in its entirety.

TECHNICAL FIELD

The present disclosure relates to a window expansion method and associated electronic device.

BACKGROUND

When an application in need of a variable window area, such as a web browser in a Personal Computer (PC) runs, a display device may display the running application in a window area. The widow area has a size and may be freely scalable within the display area. For example, the user may change the size of the window area of the web browser with an input means, such as a mouse or a tablet pen.

When an application in need of a window area that enables both receiving and displaying input data, such as text, user notes, a memo application, the display device may display the window area of the application. For example, when the user inputs text or user notes with an input means, the display device may display the input text or user notes in the window area. If the window area has a default size and cannot display any more data in the window area, the display device may make room for newly input data within the window area by moving the existing text out of the window area. In case of user notes, the display device may expand the window area at the user's request to change the size of the window area and then display the user notes in the expanded window.

As such, if there is no room in the window area for receiving or displaying newly input data, the display device of related art may make room within the window area by moving the existing data or expand the window area to a certain extent at the user's request.

Text input in succession may cause the display device to keep moving the existing text out of the window area to make room for newly input text, and thus the user may not view the entire text in the window area.

Furthermore, when successive user notes are input to the display device, since the window area may be expanded only at the user's request, it will be cumbersome for the user to perform an event to expand the window area while inputting user notes.

Accordingly, a window expansion method and associated electronic device for automatically expanding a window area by analyzing an input event pattern is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a window expansion method and associated electronic device for automatically expanding a window area by analyzing an input event pattern.

In accordance with an aspect of the present disclosure, an electronic device is provided. The electronic device includes a display unit including a window area for displaying data and a non-window area, and a controller configured to expand the window area based on an expansion event for an expansion of the window area when the expansion event occurs.

In accordance with another aspect of the present disclosure, a window expansion method is provided. The window expansion method includes detecting an occurrence of an expansion event for expanding a window area, and expanding the window area based on the expansion event.

Other aspects, advantages, and salient features of the disclosure will become apparent to those skilled in the art from the following detailed description, which, taken in conjunction with the annexed drawings, discloses various embodiments of the present disclosure

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2, 3A, 3B, 3C, and 3D illustrate a window area and a non-window area within a display area according to an embodiment of the present disclosure;

Throughout the drawings, like reference numerals will be understood to refer to like parts, components, and structures.

DETAILED DESCRIPTION

Figure 1:
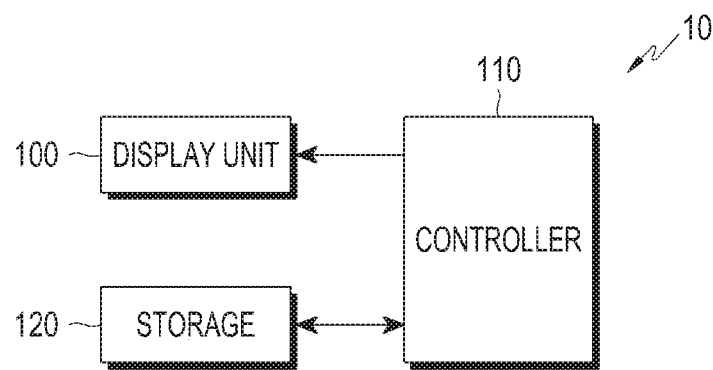
FIG. 1 illustrates a block diagram of an electronic device according to an embodiment of the present disclosure.
Figure 2:
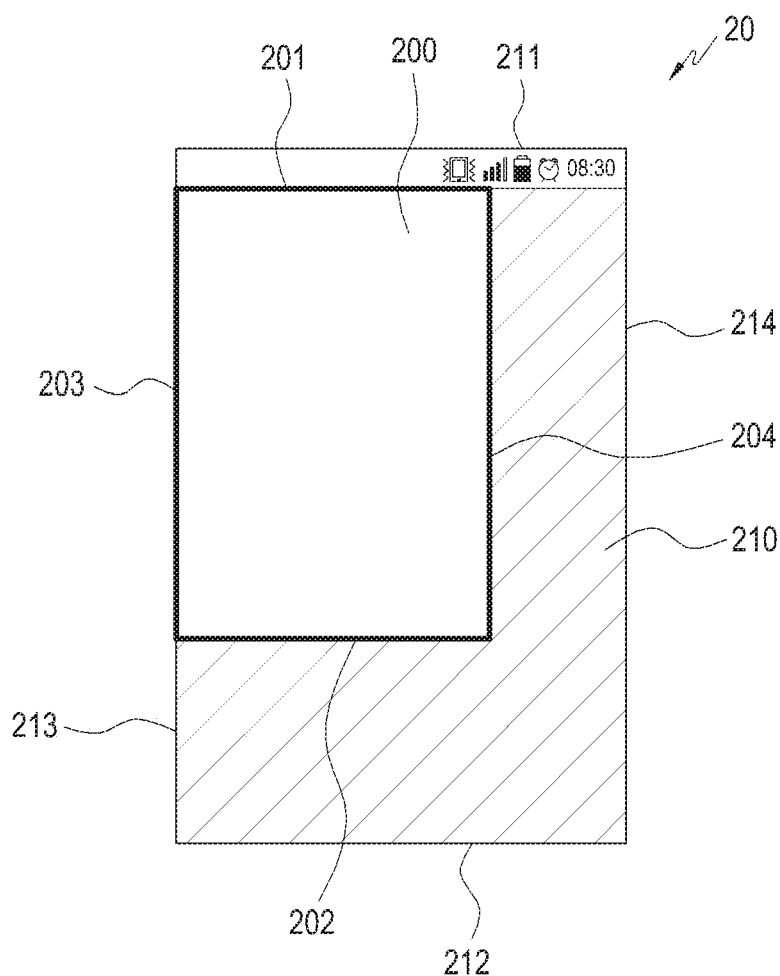

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

The electronic device may be any device that has a display unit, and be referred to as a portable device, mobile terminal, communication terminal, portable communication terminal, portable mobile terminal, etc.

For example, the electronic device may be a smartphone, a cell phone, a game console, a television, a display device, a vehicle head unit, a notebook computer, a laptop, a tablet Personal Computer (PC), a Personal Media Player (PMP), a Personal Digital Assistant (PDA), or the like. The electronic device may be implemented as a pocket-sized portable communication terminal that has a wireless communication functionality. Further, the electronic device may be a flexible display device. Of course, any other device that is equipped with at least one image sensor may also be used to perform various embodiments of the present disclosure. The electronic device may also include a device for virtual space.

In various embodiments of the present disclosure, a portable device will be taken as a representative example of the electronic device, and some components of the portable device may be omitted or replaced if necessary.

FIG. 1 illustrates a block diagram of an electronic device according to an embodiment of the present disclosure.

Referring to FIG. 1, the electronic device 10 includes a display unit 100, a controller 110, and a storage 120.

The display unit 100 may be implemented in a form of a touch screen that may receive a user input (or a touch input) that occurs when a part of the user's body (for example, a finger of the user) contacts the display unit 100.

In an embodiment of the present disclosure, the display unit 100 may form a display area that includes a window area and a non-window area.

The window area used herein may refer to an area that has a random size within the display area. The window area may display input data, such as touches, user notes, drawings, etc., an object, such as text, an image, a video, or the like inserted by the user, and a screen comprised of at least one object. For example, the window area may be an input and display area for a memo or note application, a display area for a web browser, an input and display area for a messenger application, a display area for a multi-window screen, or the like.

The non-window area may correspond to an area other than the window area within the display area.

The controller 110 controls general operation of the display unit 100 and the storage 120. In an embodiment of the present disclosure, the controller 110 may analyze an input event pattern for expanding the window area and expand the window area based on the analyzed input event pattern.

Specifically, the controller 110 may calculate a size for expansion of the window area based on an input event detected in the non-window area and expand the window area to an extent of the calculated size for expansion of the window area.

The controller 110 may expand the window area as in following various embodiments.

In an embodiment of expanding the window area, the controller 110 may calculate a size for expansion of the window area for displaying input data from an input event when detecting the input event in the non-window area beyond the window area, expand the window area to an extent of the size for expansion of the window area, and display the input data in the expanded window area.

In an embodiment of expanding the window area, the controller 110 may calculate a size for expansion of the window area for displaying an object inserted by the user into the window area if the object goes beyond the window area, expand the window area to an extent of the size for expansion of the window area, and display the entire object in the expanded window area. In this regard, the controller 110 may expand the window area to such an extent that the object exceeds the boundary of the window area. For example, if an object dragged and dropped, or copied and pasted by the user with an input means, such as the user's finger or a stylus pen goes beyond the window area, the controller 110 may calculate an extent that the object deviates from the window area as a size for expansion of the window area, and expand the window area to the extent of the size for expansion of the window area.

In an embodiment of expanding the window area, to display a sub-window, such as a pop-up window, that exceeds the window area in size, while a particular application is running, the controller 110 may expand the window area to such an extent that the sub-window exceeds the window area.

The controller 110 may calculate a size for expansion of the window area as in following various embodiments.

In the embodiment of calculating a size for expansion of the window area, the controller 110 may calculate the size for expansion of the window area using numerical data of previously input data. The numerical data of the input data may refer to a horizontal, vertical, average, maximum, and/or minimum size of the input data.

In the embodiment of calculating a size for expansion of the window area, when an object inserted by the user into the window area exceeds the boundary of the window area, the controller 110 may calculate an extent to which the object deviates beyond the window area as the size for expansion of the window area.

In the embodiment of calculating a size for expansion of the window area, when a sub-window, such as a pop-up window to be displayed exceeds the window area, the controller 110 may calculate an extent to which the sub-window exceeds the window area as the size for expansion of the window area.

The storage 120 may store input/output signals and/or data resulting from operation of the display unit 100 under control of the controller 110. The storage 120 may store control programs and applications for controlling the electronic device 10 and/or the controller 110.

FIGS. 2, 3A, 3B, 3C, and 3D illustrate a window area and a non-window area within a display area according to an embodiment of the present disclosure.

Referring to FIGS. 2, 3A, 3B, 3C and 3D a display area 20 may include a window area 200 and a non-window area 210. The window area 200 refers to an area having a size within the display area 20 for displaying at least one of input data, an object, and a sub-window. The non-window area 210 refers to an area other than the window area 200 within the display area 20 for detecting input data, an object, or a sub-window that deviates from the window area 200.

In an embodiment of the present disclosure, the window area 200 may have four sides 201, 202, 203, and 204. Likewise, the display area has four sides, top 211, bottom 212, left 213 and right 214. The window area 200 may be displayed in various locations within the display area 20. For example, in FIG. 3A, among top 300, bottom 310, left 320, and right 330 of the display area, the window area 200 is on the top left side of the display area. Other area than the window area 200 may be the non-window area 210.

The window area 200 may also be located on the bottom left of the display area, as illustrated in FIG. 3B, on the bottom right of the display area, as illustrated in FIG. 3C, and in the center of the display area, as illustrated in FIG. 3D. The non-window area 210 may be other areas than the aforementioned window area 200.

FIGS. 4, 5A, 5B, 6A and 6B illustrate processes of calculating a size for expansion of the window area 200 with respect to previously input data according to an embodiment of the present disclosure.

Figure 4:
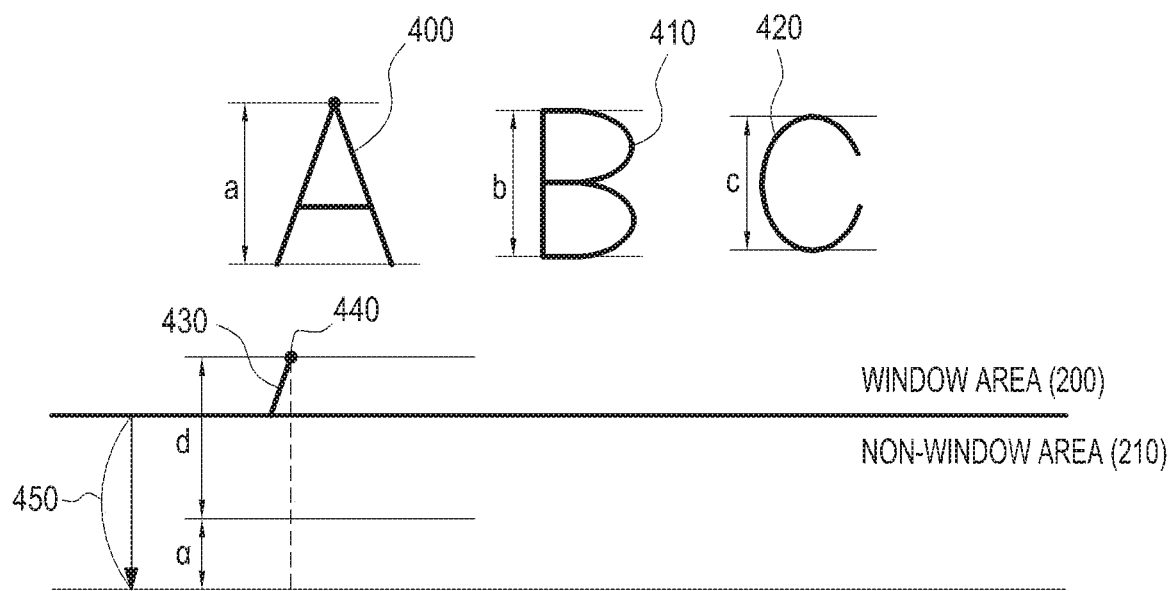
FIGS. 4, 5A, 5B, 6A and 6B illustrate processes of calculating a size for expansion of a window area based on previously input data according to an embodiment of the present disclosure.

FIG. 4 illustrates a process of calculating a size for expansion of the window area with respect to previously input data according to an embodiment of the present disclosure.

Referring to FIG. 4, the controller 110 may display drawing inputs (or input data), e.g., 'A' 400, 'B' 410, and 'C' 420 within the window area 200. If the drawing input 430 that begins at a point 440 in the window area 200 approaches the non-window area 210, the controller 110 may calculate numerical data d of previous drawing inputs e.g., 'A' 400, 'B' 410, and 'C' 420. The numerical data may refer to a horizontal or vertical size of the input data, or an average, maximum, and/or minimum horizontal or vertical size of the input data.

For example, assuming that the numerical data is an average vertical size of drawing inputs, the numerical data of drawing inputs 'A' 400, 'B' 410, and 'C' 420 may be an average of horizontal sizes "a", "b", and "c" of 'A' 400, 'B' 410, and 'C' 420, respectively.

While this embodiment illustrates a case where the window area expands in the vertical direction, the window area may expand in the horizontal direction in other various embodiments. In the latter case, the controller 110 may calculate a horizontal size of input data, and/or an average, maximum, and/or minimum horizontal size of the input data as the numerical data of the input data.

The controller 110 may calculate a size 450, which is equal to the numerical data "d" starting from the point 440 at which the drawing input 430 begins, plus a margin "α", as a size for expansion of the window area 200, expand the window area 200 by an extent of the calculated size for expansion of the window area into the non-window area 210, and display the input data in the expanded window area. The margin a may be optional and set in any size.

Alternatively, the controller 110 may calculate a size for expansion of the window area to be numerical data d multiplied by a natural number n, plus the margin "α", "d*n+α".

Figure 5A:
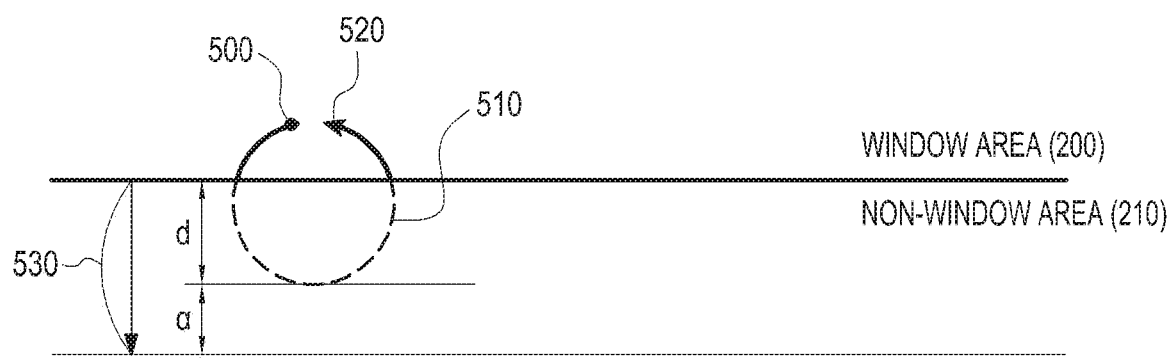
Figure 5B:
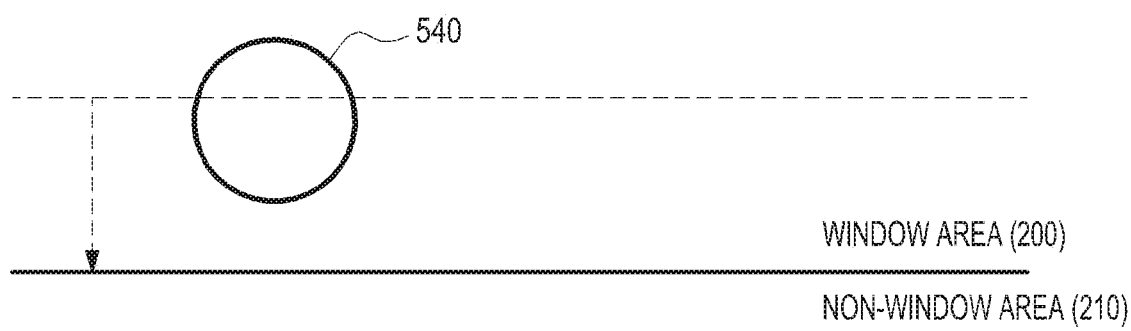

FIGS. 5A and 5B illustrate a process of calculating a size for expansion of a window area based on input data detected in the non-window area according to an embodiment of the present disclosure.

Referring to FIG. 5A, a drawing that begins in the window area 200 and continues into the non-window area 210 is detected in the non-window area 210, the controller 110 may expand the window area 200 to display the drawing detected in the non-window area 210.

For example, when a drawing input is displayed 500 within the window area 200, detected 510 in the non-window area 210, and displayed 520 back in the window area 200, the controller 110 may calculate the size "d" to display the drawing input detected in the non-window area 210. The controller 110 may then calculate the size for expansion 530 of the window area 200 to be the size "d" plus the margin "α", "d+α".

Referring to FIG. 5B, as a result of the calculation in FIG. 5A, the controller 110 may expand the window area 200 to an extent of the calculated size for expansion and display the entire drawing input 540 within the expanded window area 200.

Alternatively, the controller 110 may calculate a size for expansion of the window area 200 to be the calculated size "d" multiplied by a natural number "n", plus the margin "α", "d*n+α".

Figure 6A:
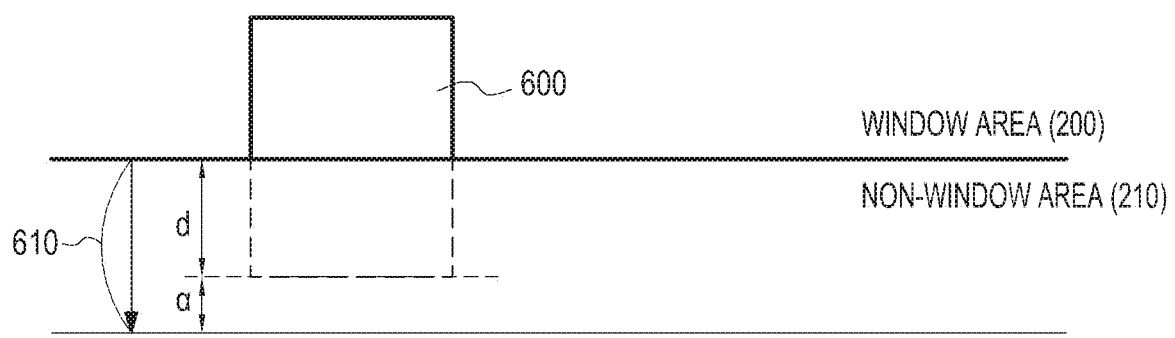
Figure 6B:
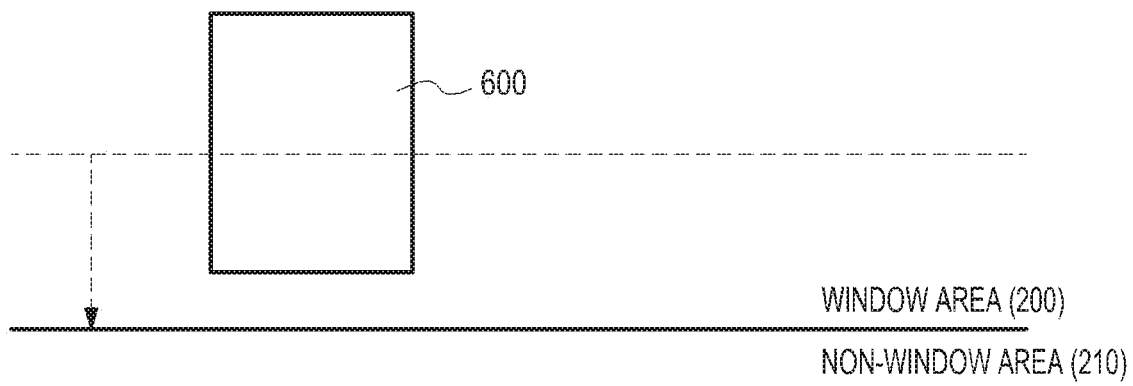

FIGS. 6A and 6B illustrate a process of calculating a size for expansion of the window area 200 when an object inserted into the window area 200 goes beyond the window area 200 according to an embodiment of the present disclosure.

Referring to FIG. 6A, when an object 600 inserted by the user goes beyond the window area 200, the controller 110 may expand the window area 200 to such an extent that the object 600 goes over the window area 200.

For example, the controller 110 may calculate a size d that corresponds to the extent to which the object 600 goes beyond the window area 200, and determine a size for expansion 610 of the window area 200 to be the size d plus a margin "α", "d+α". Alternatively, the controller 110 may calculate a size for expansion of the window area 200 to be the size d multiplied by a natural number n, plus the margin "α", "d*n+α".

Referring to FIG. 6B, the controller 110 may then expand the window area 200 by the calculated size for expansion of the window area 200 and display the entire object 600 in the expanded window area 200.

FIGS. 7A to 7D illustrate a process of calculating a size for expansion of the window area when a size of a sub-window exceeds that of the window area according to an embodiment of the present disclosure.

Figure 7A:
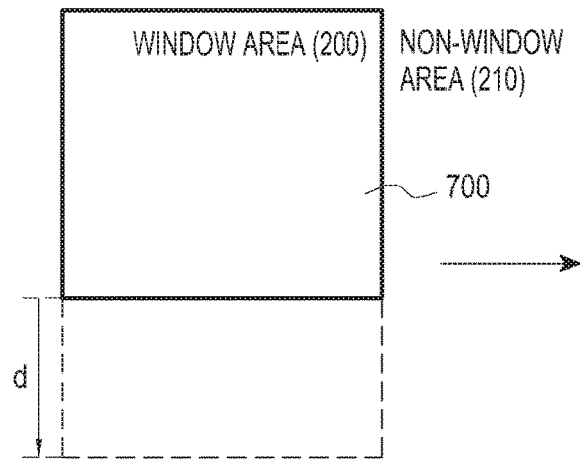
FIGS. 7A, 7B, 7C, and 7D illustrate a process of calculating a size for expansion of a window area when a sub-window exceeds the window area according to an embodiment of the present disclosure.
Figure 7B:
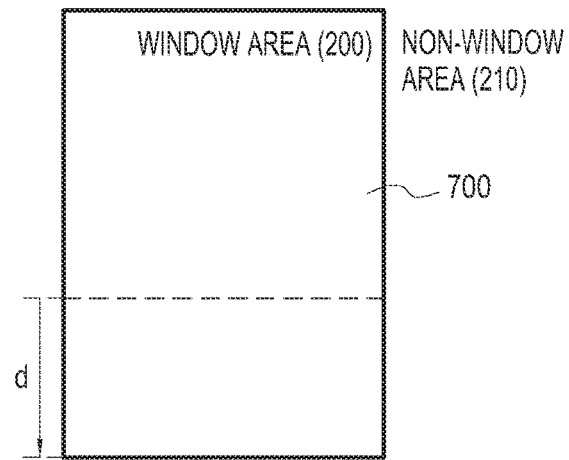

Referring to FIGS. 7A-7B, a sub-window 700, such as a pop-up window displayed by running an application may be displayed in the window area 200. If the size of the sub-window 700 exceeds that of the window area 200, as illustrated in FIG. 7A, the controller 110 may expand the window area 200 to such an extent that the sub-window 700 exceeds the window area 200.

For example, the controller 110 may calculate a size "d", the extent to which the sub-window 700 exceeds the window area 200, as a size for expansion of the window area 200. The controller 110 may then expand the window area 200 by the size for expansion and display the entire sub-window 700 in the expanded window area 200, as illustrated in FIG. 7B.

Figure 7C:
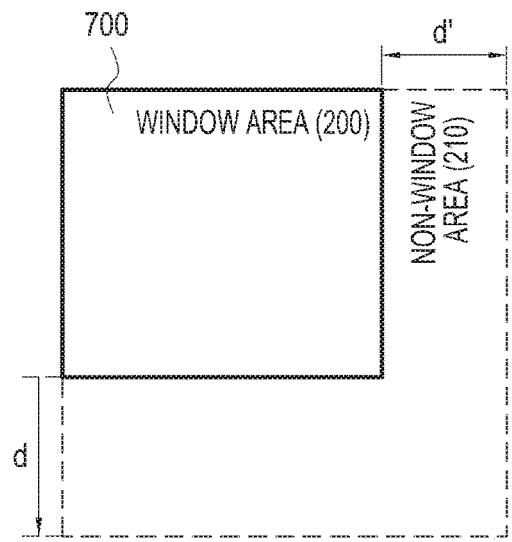
Figure 7D:
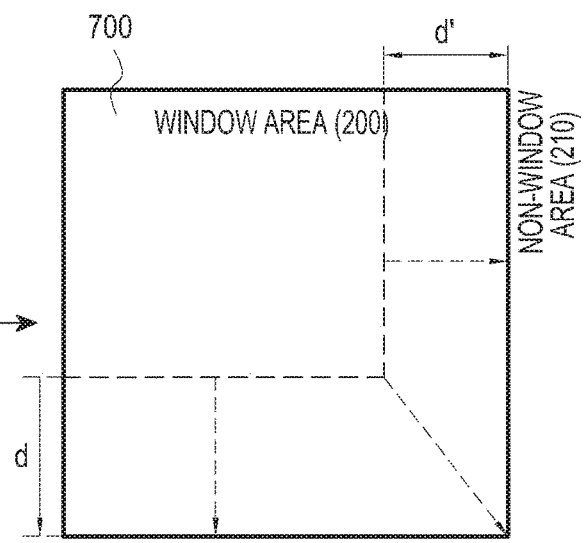

In another embodiment where the sub-window 700 exceeds the window area 200 in size, as illustrated in FIG. 7C, the controller 110 may calculate a vertical size "d" and a horizontal size "d" of the sub-window 700 that deviates off the window area 200 for expansion of the window area 200. The controller 210 may then expand the window area 200 by the calculated size in horizontal and vertical directions and display the entire sub-window 700 in the expanded window area 200, as illustrated in FIG. 7D.

FIGS. 8A to 8D illustrate a process of the controller 110 expanding the window area 200 to an extent of a size for expansion of the window area 200 according to an embodiment of the present disclosure.

In the embodiment, assume that continuing user notes are being input and displayed in the display area.

Figure 8A:
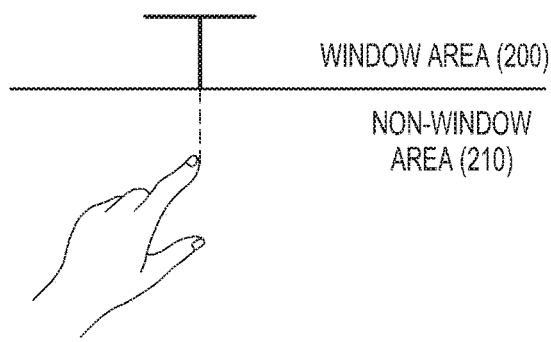
FIGS. 8A, 8B, 8C, and 8D illustrate a process of a controller expanding a window area to an extent of a calculated size for expansion of the window area according to an embodiment of the present disclosure.

Referring to FIG. 8A, when a user note is input by the user beginning from the window area 200 and continuing into the non-window area 210 is displayed in the window area 200 and detected in the non-window area 210, the controller 110 may calculate a size for expansion of the window area 200 based on the user note detected in the non-window area 210.

The controller 110 may hold expansion of the window area 200 from when the user note is input in the non-window area 210 until a time period.

Figure 8B:
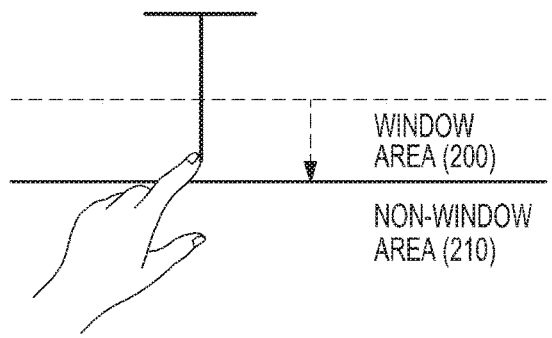

Referring to FIG. 8B, after a lapse of the time period, the controller 110 may expand the window area 200 by the calculated size for expansion. The controller 110 may receive and display continued user notes in the expanded window area 200.

Figure 8C:
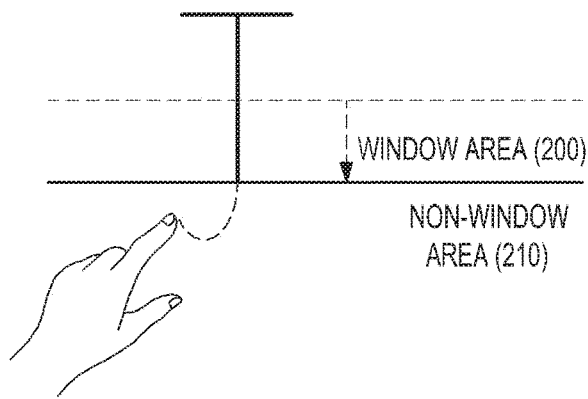

Referring to FIG. 8C, when a continued user note is detected in the non-window area 210, the controller 110 may calculate a size for expansion based on the user note detected in the non-window area 210.

The controller 110 may hold expansion of the window area 200 from when the user note is input in the non-window area 210 for a time period.

Figure 8D:
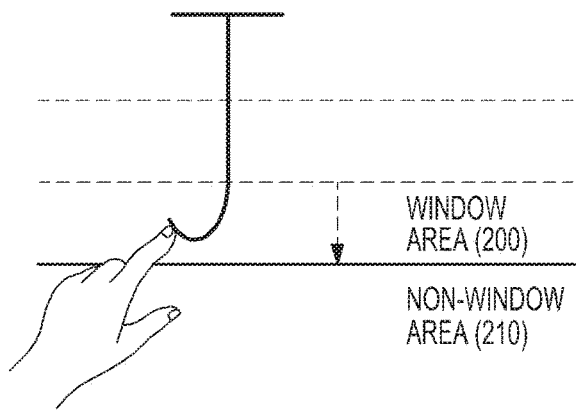

Referring to FIG. 8D, after a lapse of the time period and/or upon completion of user note input, the controller 110 may expand the window area 200 by the size for expansion and display the user note in the expanded window area 200.

Figure 9A:
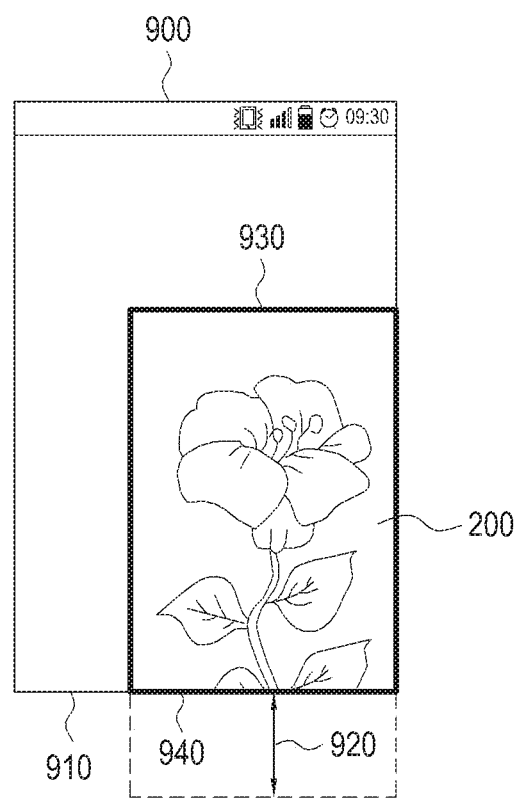
FIGS. 9A and 9B illustrate a process of displaying an input when there is no more extra room for expansion according to an embodiment of the present disclosure.
Figure 9B:
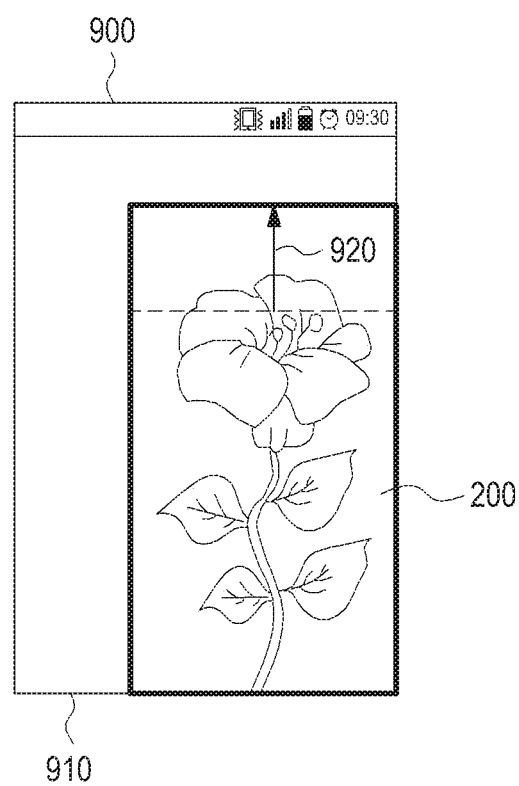

FIGS. 9A and 9B illustrate a process of displaying an input when there is no more extra room for expansion according to an embodiment of the present disclosure.

In the embodiment, assume that the window area 200 expands in the direction from bottom 910 to top 900 of the display area 20.

Furthermore, assume that the bottom 910 of the display area 20 and a lower edge 940 of the window area 200 are so close that there is no more extra room for expansion of the window area 200.

Referring to FIG. 9A, if a size of an image exceeds the viewable window area 200, but there is no more extra room for expansion of the window area 200, the controller 110 may calculate a size 920 for expansion of the window area 200.

Referring to FIG. 9B, the controller 110 may expand the window area 200 by the size 920 for expansion in the direction from bottom 910 to top 900 of the display area 20 and display the image in the expanded window area 200.

Figure 10:
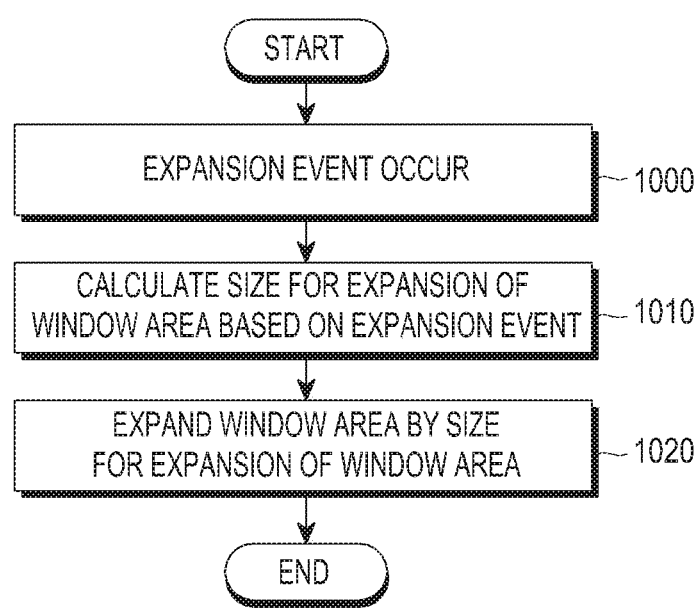
FIG. 10 is a flowchart illustrating a process of expanding a window area according to an embodiment of the present disclosure.

FIG. 10 is a flowchart illustrating a process of expanding a window area according to an embodiment of the present disclosure.

In operation 1000, the controller 110 may detect an occurrence of an expansion event, and in operation 1010, the controller 110 may calculate a size for expansion of the window area 200 based on the expansion event. The expansion event may be an event in which input data is detected in the non-window area 210, an event in which an object inserted by the user into the window area 200 goes beyond the window area 200, an event in which the size of a sub-window exceeds the size of the window area 200, and/or the like.

In operation 1020, the controller 110 may expand the window area 200 by the calculated size for expansion, which will be described below in more detail in connection with FIGS. 11 to 13.

Figure 11:
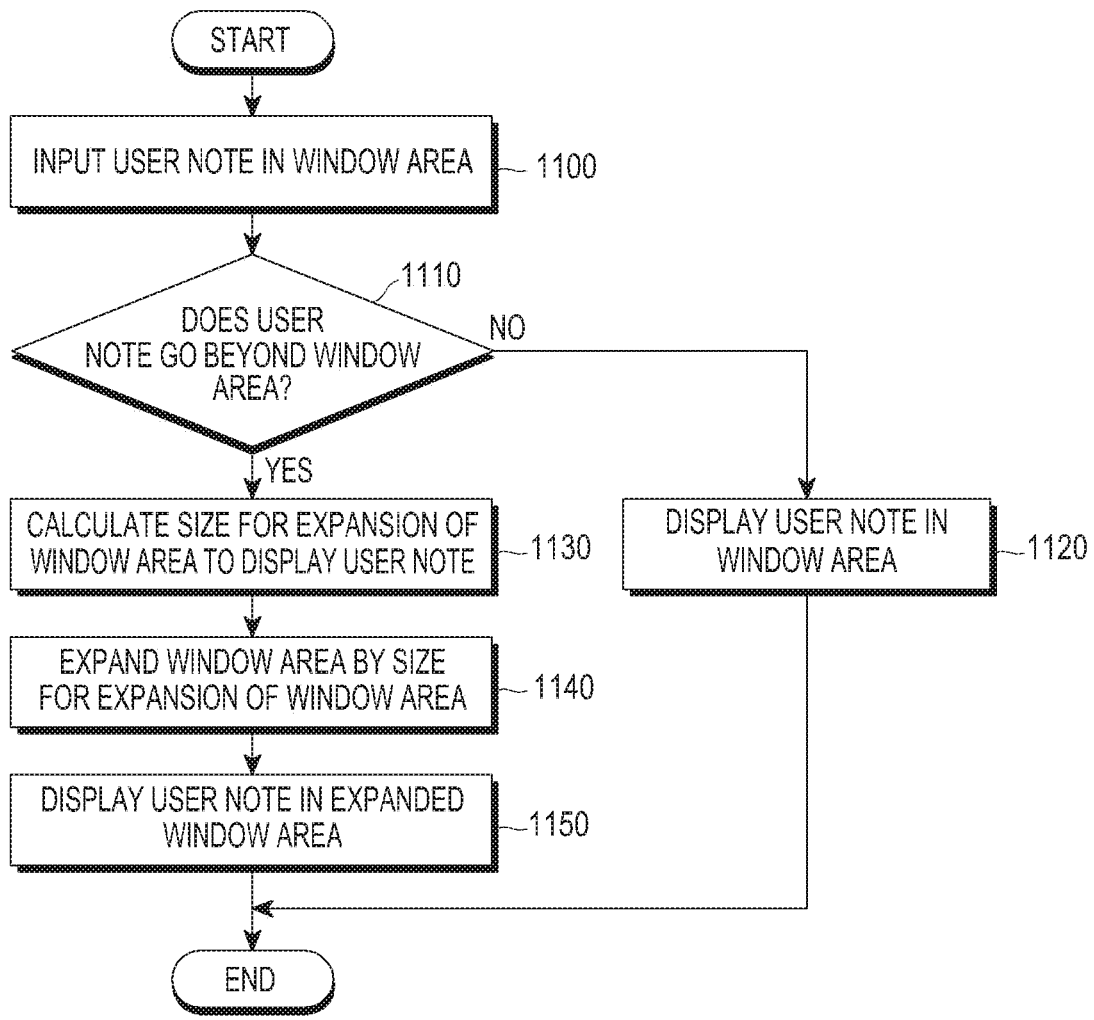
FIG. 11 is a flowchart illustrating a process of expanding a window area with respect to user note inputs according to an embodiment of the present disclosure.

FIG. 11 is a flowchart illustrating a process of expanding a window area with respect to user notes according to an embodiment of the present disclosure.

Referring to FIG. 11, in operation 1100, the controller 110 may receive a user note in the window area 200.

In operation 1110, the controller 110 determines whether the user note has gone beyond the window area 200, and if determining that the user note has gone beyond the window area 200, the controller 110 proceeds to operation 1130. Otherwise, if determining that the user note has not gone beyond the window area 200, in operation 1120, the controller 110 may display the input user note in the window area 200.

In operation 1130, the controller 110 may calculate a size for expansion of the window area 200 to cover the user note. Specifically, the controller 110 may calculate the size for expansion of the window area 200 based on the part of the user note that has gone beyond the window area 200 and that is detected in the non-window area 210. For example, the controller 110 may use numerical data about the detected user note to calculate the size for expansion of the window area 200.

In operation 1140, the controller 110 may expand the window area 200 by the calculated size for expansion of the window area 200, and in operation 1150, the controller 110 may display the user note input in the expanded window area 200.

Figure 12:
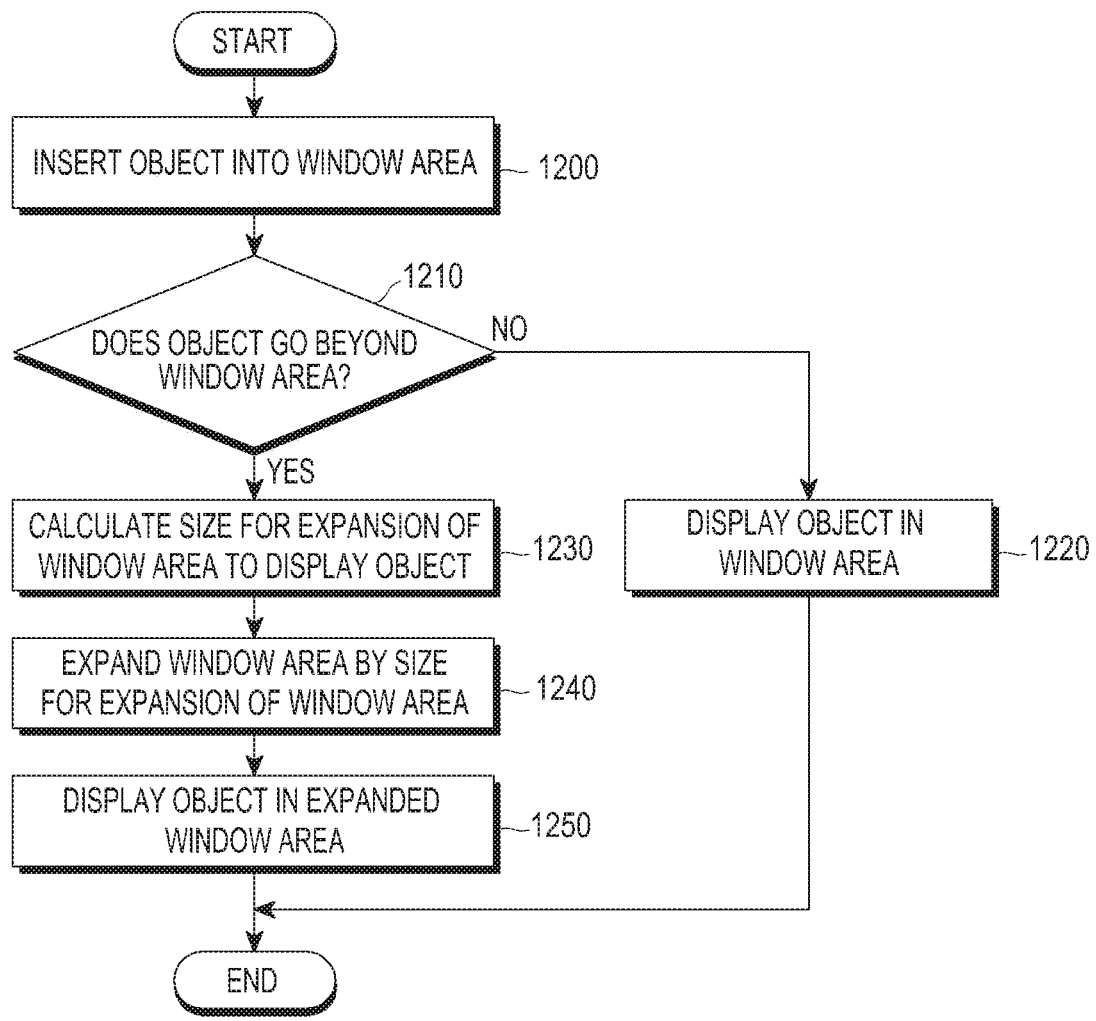
FIG. 12 is a flowchart illustrating a process of expanding a window area with respect to insertion of an object according to an embodiment of the present disclosure.

FIG. 12 is a flowchart illustrating a process of expanding a window area with respect to object insertion according to an embodiment of the present disclosure.

Referring to FIG. 12, in operation 1200, the controller 110 may insert an object into the window area 200.

In operation 1210, the controller 110 determines whether the object has gone beyond the window area 200, and if determining that the object has gone beyond the window area 200, the controller proceeds to operation 1230. Otherwise, if determining that the object has not gone beyond the window area 200, in operation 1220, the controller 110 may display the object in the window area 200.

In operation 1230, the controller 110 may calculate a size for expansion of the window area 200 to cover the object that deviates off the window area 200. Specifically, the controller 110 may calculate an extent to which the object deviates off the window area 200 as a size for expansion of the window area 200.

In operation 1240, the controller 110 may expand the window area 200 by the calculated size for expansion, and in operation 1250, display the object in the expanded window area 200.

Figure 13:
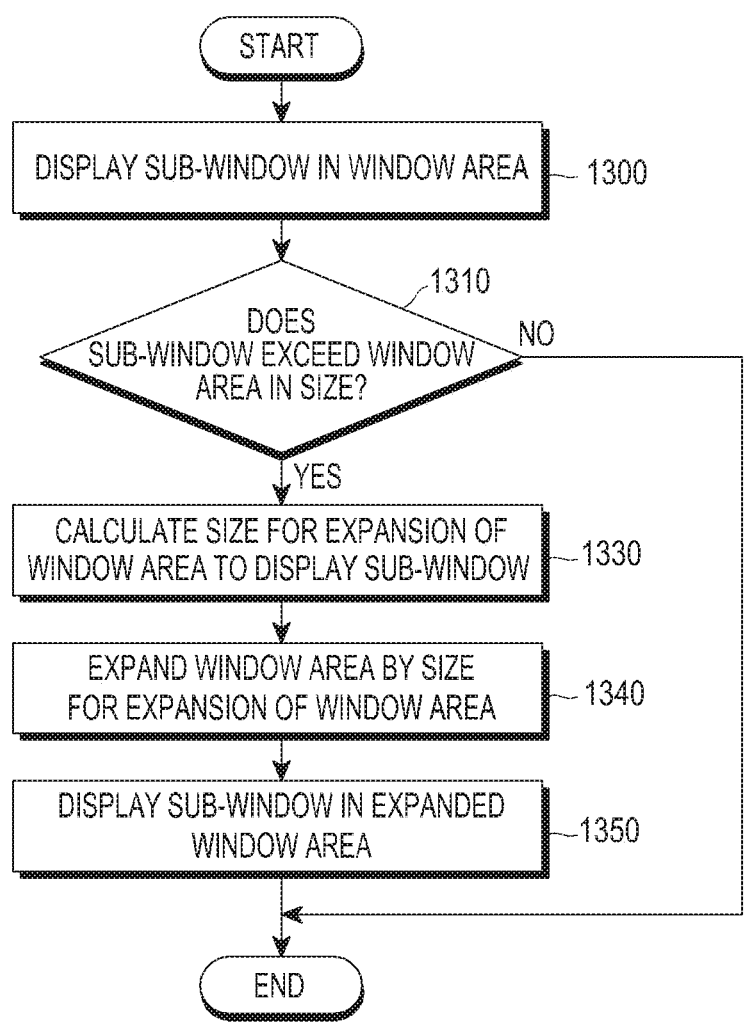
FIG. 13 is a flowchart illustrating a process of expanding a window area with respect to a size of a sub-window according to an embodiment of the present disclosure.

FIG. 13 is a flowchart illustrating a process of expanding a window area with respect to a sub-window size according to an embodiment of the present disclosure.

Referring to FIG. 13, in operation 1300, the controller 110 may display a sub-window in the window area 200. Specifically, the controller 110 may display a sub-window, such as a pop-up window generated by running a particular application.

In operation 1310, the controller 110 may determine whether the size of the sub-window exceeds that of the window area 200, and if determining that the size of the sub-window exceeds that of the window area 200, the controller 110 may proceed to operation 1330, or otherwise, the controller 110 ends the process of expanding the window area 200. In other words, the controller 110 may not change the state of displaying an object inserted in the window area 200 if determining that the size of the sub-window does not exceeds the window area 200.

In operation 1330, the controller 110 may calculate a size for expansion of the window area 200 to cover the sub-window that goes beyond the window area 200. Specifically, the controller 110 may calculate an extent to which the sub-window goes beyond the window area 200 as a size for expansion of the window area 200.

In operation 1340, the controller 110 may expand the window area 200 by the calculated size for expansion, and in operation 1350, the controller 110 may display the sub-window in the expanded window area 200.

Figures 14A, 14B:
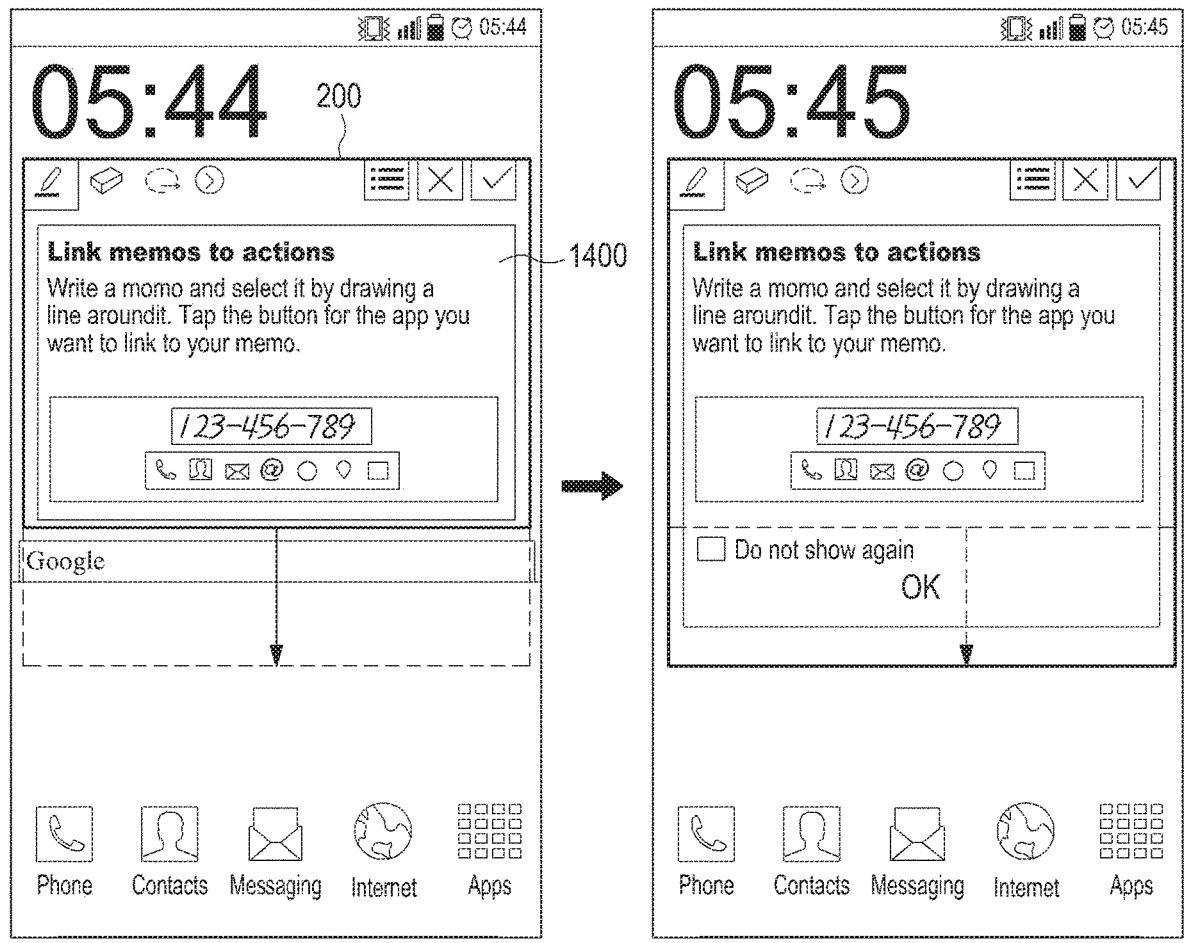
FIGS. 14A and 14B illustrate how to display a sub-window using window expansion according to an embodiment of the present disclosure.

FIGS. 14A and 14B illustrate how to display a sub-window using window expansion according to an embodiment of the present disclosure.

Referring to FIG. 14A, the controller 110 may display a sub-window 1400 in the window area 200 by running a particular application. In displaying the sub-window 1400 in the window area 200, if a total size of the sub-window 1400 is greater than that of the window area 200, the controller 110 may calculate an extent to which the sub-window 1400 exceeds the window area 200 as a size for expansion of the window area 200.

Referring to FIG. 14B, the controller 110 may expand the window area 200 by the calculated size for expansion of the window area 200, and display the entire sub-window 1400 in the expanded window area 200.

Figure 15A:
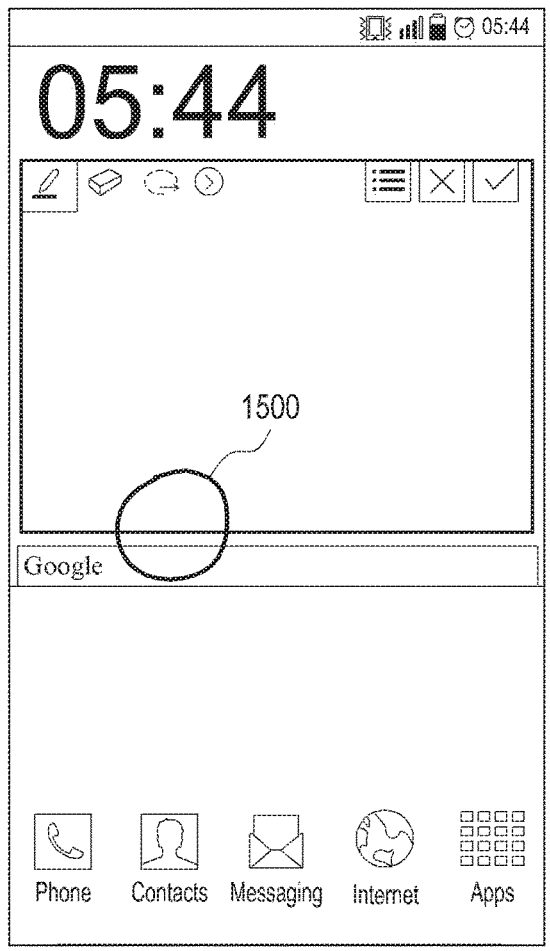
FIGS. 15A and 15B illustrate how to display an input drawing using window expansion according to an embodiment of the present disclosure.
Figure 15B:
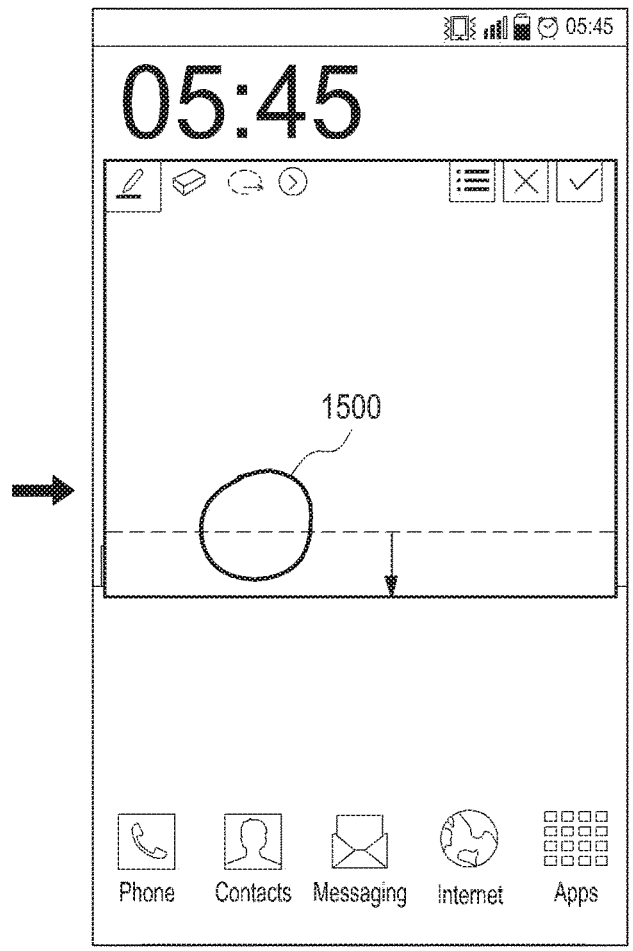

FIGS. 15A and 15B illustrate how to display an input drawing using window expansion according to an embodiment of the present disclosure.

Referring to FIG. 15A, if a drawing input 1500 goes beyond the window area 200, the controller 110 may expand the window area 200.

Referring to FIG. 15B, the controller 110 may expand the window area 200 to such an extent that the drawing input 1500 goes beyond the window area 200 and display the entire drawing input 1550 in the expanded window area 200.

As such, the various embodiments of the present disclosure may provide a window area automatically expanded without separate user manipulation, by calculating a size for expansion of the window area based on an expansion event and expanding the window area by the calculated size for expansion of the window area, thereby improving user convenience.

It will be appreciated that the various embodiments of the present disclosure may be implemented in a form of hardware, software, or a combination of hardware and software. The software may be stored as program instructions or computer readable codes executable on the processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium may also be distributed over network coupled computer systems so that the computer readable code is stored and executed in a distributed fashion. This media may be read by the computer, stored in the memory, and executed by the processor. The various embodiments may be implemented by a computer or portable terminal including a controller and a memory, and the memory may be an example of the computer readable recording medium suitable for storing a program or programs having instructions that implement the various embodiments of the present disclosure.

The present disclosure may be implemented by a program having codes for embodying the apparatus and method described in claims, the program being stored in a machine (or computer) readable storage medium. The program may be electronically carried on any medium, such as communication signals transferred via wired or wireless connection, and the present disclosure suitably includes its equivalent.

The electronic device may receive the program from a program provider wired/wirelessly connected thereto, and store the program. The program provider may include a memory for storing programs having instructions to perform the various embodiments of the present disclosure, information necessary for the various embodiments of the present disclosure, etc., a communication unit for wired/wirelessly communicating with the electronic device, and a controller for sending the program to the electronic device on request or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
    a touchscreen display; and
    a processor configured to:
    display, on the touchscreen display, a first screen in a first pop-up window size over a second screen, wherein the first screen includes an execution screen of a first application and the second screen is a remaining display screen area underneath an area of the first screen,
    receive a drawing input, while a size of the first screen is maintained, which is a continuous drag input starting on the first screen and extending beyond an edge of the first pop-up window size onto the second screen,
    in response to reception of the drawing input while the size of the first screen is maintained, process the drawing input, including a portion of the drawing input that extends beyond the edge of the first pop-up window size, as drawing information, and display, on the touchscreen display, the first screen in a second pop-up window size, which is larger than the first pop-up window size, for causing the portion of the drawing input that extends beyond the edge of the first pop-up window size to be displayed, wherein the first screen displayed in the second pop-up window size visually provides drawing information corresponding to the portion of the drawing input that extends beyond the edge of the first pop-up window size.

2. The electronic device of claim 1, wherein the first application includes at least one of a memo application, note application, web browser application or message application.

3. A method for controlling an electronic device, the method comprising:

displaying, on a touchscreen display of the electronic device, a first screen in a first pop-up window size over a second screen, wherein the first screen includes an execution screen of a first application and the second screen is a remaining display screen area underneath an area of the first screen;

receiving a drawing input, while a size of the first screen is maintained, which is a continuous drag input starting on the first screen and extending beyond an edge of the first pop-up window size onto the second screen;

in response to reception of the drawing input while a size of the first screen is maintained, process the drawing input, including a portion of the drawing input that extends beyond the edge of the first pop-up window size, as drawing information; and displaying, on the touchscreen display, the first screen in a second pop-up window size which is larger than the first pop-up window size, for causing the portion of the drawing input that extends beyond the edge of the first pop-up window size to be displayed, wherein the first screen displayed in the second pop-up window size visually provides drawing information corresponding to the portion of the drawing input that extends beyond the edge of the first pop-up window size.

4. The method of claim 3, wherein the first application includes at least one of a memo application, note application, web browser application or message application.

5. An electronic device, comprising:

a touchscreen display, and at least one processor configured to:

display, on the touchscreen display, a pop-up window area configured to receive a drawing input and a remaining display screen area underneath the pop-up window area, identify a first drawing input while a size of the pop-up window area is maintained, wherein the first drawing input is a continuous drag input starting from the pop-up window area and ending in the remaining display screen area, wherein the pop-up window area corresponds to an execution screen of a memo application, and store an object corresponding to the first drawing input and including a first part of the object corresponding to the pop-up window area and a second part of the object corresponding to the remaining display screen area, wherein the second part of the object is continuously displayed upon an extension of the pop-up window area.

6. The electronic device of claim 5, wherein the pop-up window area overlaps the remaining display screen area.

7. The electronic device of claim 5, wherein the pop-up window area is expanded pop-up when the object is stored.

8. The electronic device of claim 7, wherein the object is displayed on the expanded pop-up window area.

9. The electronic device of claim 5, wherein the at least one processor is further configured to identify a size for the expansion of the pop-up window area based on the first drawing input.

10. The electronic device of claim 5, wherein the first drawing input is made by a stylus pen.

11. A method for controlling an electronic device, the method comprising:

displaying, on a touchscreen display of the electronic device, a pop-up window area configured to receive a drawing input and a remaining display screen area underneath the pop-up window area;

identifying a first drawing input while a size of the pop-up window area is maintained, wherein the first drawing input is a continuous drag input starting from the pop-up window area and ending in the remaining display screen area, wherein the pop-up window area corresponds to an execution screen of a memo application; and storing an object corresponding to the first drawing input and including a first part of the object corresponding to the pop-up window area and a second part of the object corresponding to the remaining display area, wherein the second part of the object is continuously displayed upon an extension of the pop-up window area.

12. The method of claim 11, wherein the pop-up window area overlaps the remaining display screen area.

13. The method of claim 11, wherein the pop-up window area is expanded when the object is stored.

14. The method of claim 13, wherein the object is displayed on the expanded pop-up window area.

15. The method of claim 11, further comprising:

identifying a size for the expansion of the pop-up window area based on the first drawing input.

16. The method of claim 11, wherein the first drawing input is made by a stylus pen.

* * * * *